(12) United States Patent
Donti

(10) Patent No.: US 11,017,653 B1
(45) Date of Patent: May 25, 2021

(54) CELL PHONE PROXIMITY ALARM SYSTEM

(71) Applicant: Nagaraja Donti, N. Andover, MA (US)

(72) Inventor: Nagaraja Donti, N. Andover, MA (US)

( * ) Notice: Subject to any disclaimer, the term of this patent is extended or adjusted under 35 U.S.C. 154(b) by 0 days.

(21) Appl. No.: 16/835,533

(22) Filed: Mar. 31, 2020

(51) Int. Cl.
*G08B 21/24* (2006.01)
*G06K 19/077* (2006.01)

(52) U.S. Cl.
CPC ....... *G08B 21/24* (2013.01); *G06K 19/07758* (2013.01)

(58) Field of Classification Search
CPC .......................... G08B 21/24; G06K 19/07758
See application file for complete search history.

(56) References Cited

U.S. PATENT DOCUMENTS

| | | | |
|---|---|---|---|
| 7,064,663 | B2 | 6/2006 | Pucci |
| D573,498 | S | 7/2008 | Sherwood |
| 7,535,357 | B2 | 5/2009 | Enitan |
| 7,800,492 | B2 | 9/2010 | Olson |
| 2005/0231361 | A1 | 10/2005 | Godbey |
| 2005/0258966 | A1* | 11/2005 | Quan ................. G06K 7/10356 340/572.7 |
| 2007/0129113 | A1 | 6/2007 | Klicpera |
| 2010/0238042 | A1* | 9/2010 | Paul .................... G08B 21/0288 340/686.6 |
| 2012/0092160 | A1 | 4/2012 | Antonucci |
| 2012/0154119 | A1 | 6/2012 | Schepps |
| 2015/0091727 | A1 | 4/2015 | Moses |
| 2015/0302716 | A1 | 10/2015 | Portalise |
| 2016/0307007 | A1* | 10/2016 | Narasimha .............. G06F 21/35 |

FOREIGN PATENT DOCUMENTS

GB        2350464        7/1999

* cited by examiner

*Primary Examiner* — James J Yang
(74) *Attorney, Agent, or Firm* — Kyle A. Fletcher, Esq.

(57) ABSTRACT

The cell phone proximity alarm system is a proximity alarm system. The cell phone proximity alarm system is configured for use with a personal data device. The cell phone proximity alarm system tracks the personal data device by detecting the presence of the personal data device. When the cell phone proximity alarm system fails to detect the personal data device, the cell phone proximity alarm system generates an audible alarm and a tactile alarm. The cell phone proximity alarm system comprises a jewelry item, a PDD tag, and a control circuit. The PDD tag attaches to the personal data device. The jewelry item contains the control circuit. The control circuit generates a radio frequency transmission that detects the presence of the PDD tag. If the control circuit does not detect the PDD tag, the control circuit generates the audible alarm and the tactile alarm.

17 Claims, 4 Drawing Sheets

CELL PHONE PROXIMITY ALARM SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics including signaling and alarm systems, more specifically, an anti-loss alarm. (G08B21/24)

SUMMARY OF INVENTION

The cell phone proximity alarm system is a proximity alarm system. The cell phone proximity alarm system is configured for use with a personal data device. The cell phone proximity alarm system tracks the personal data device by detecting the presence of the personal data device. When the cell phone proximity alarm system fails to detect the personal data device, the cell phone proximity alarm system generates an audible alarm and a tactile alarm. The cell phone proximity alarm system comprises a jewelry item, a PDD tag, and a control circuit. The PDD tag attaches to the personal data device. The jewelry item contains the control circuit. The control circuit generates a radio frequency transmission that detects the presence of the PDD tag. If the control circuit does not detect the PDD tag, the control circuit generates the audible alarm and the tactile alarm.

These together with additional objects, features and advantages of the cell phone proximity alarm system will be readily apparent to those of ordinary skill in the art upon reading the following detailed description of the presently preferred, but nonetheless illustrative, embodiments when taken in conjunction with the accompanying drawings.

In this respect, before explaining the current embodiments of the cell phone proximity alarm system in detail, it is to be understood that the cell phone proximity alarm system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cell phone proximity alarm system.

It is therefore important that the claims be regarded as including such equivalent construction insofar as they do not depart from the spirit and scope of the cell phone proximity alarm system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application an uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
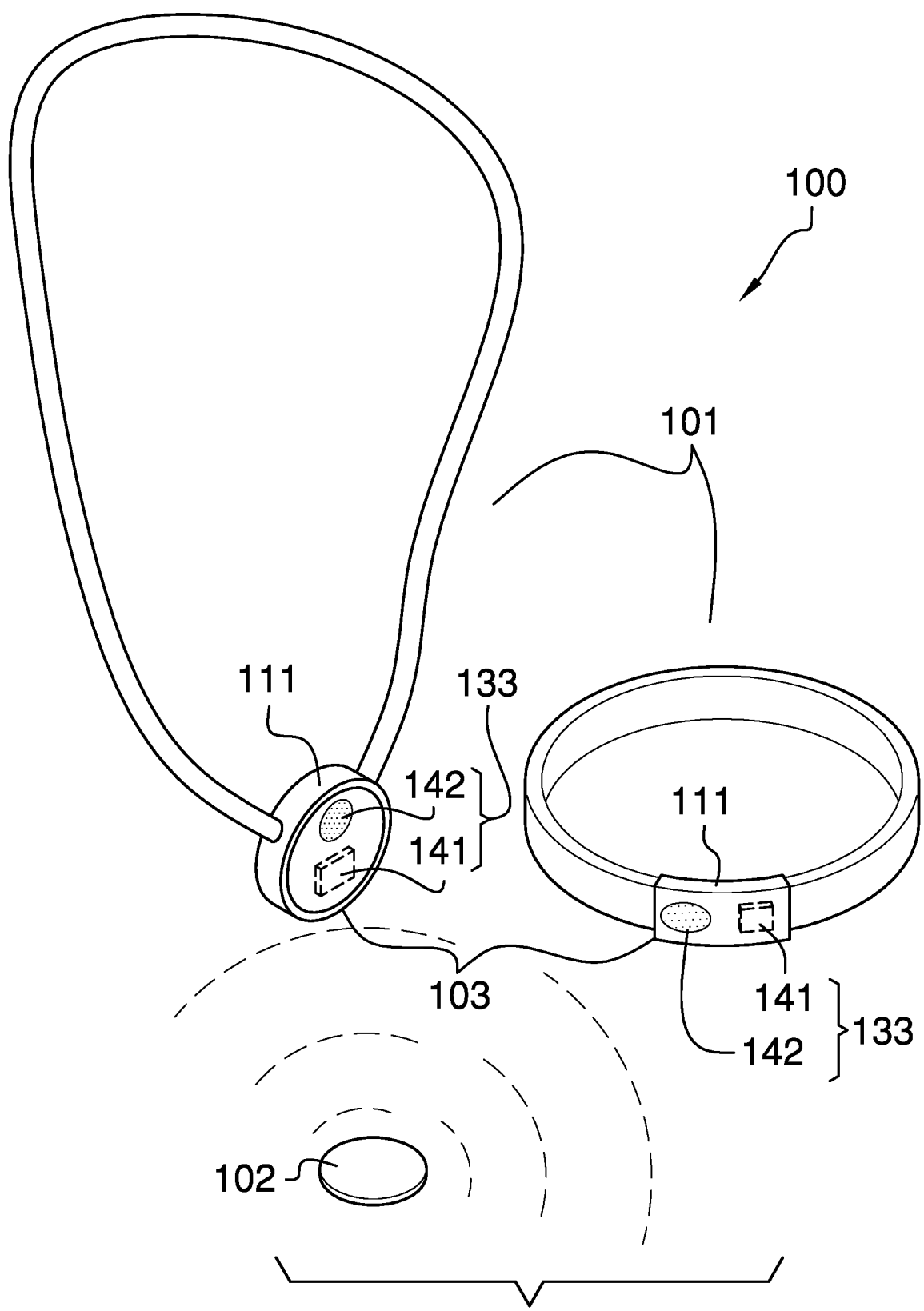
FIG. 1 is a perspective view of an embodiment of the disclosure.
Figure 2:
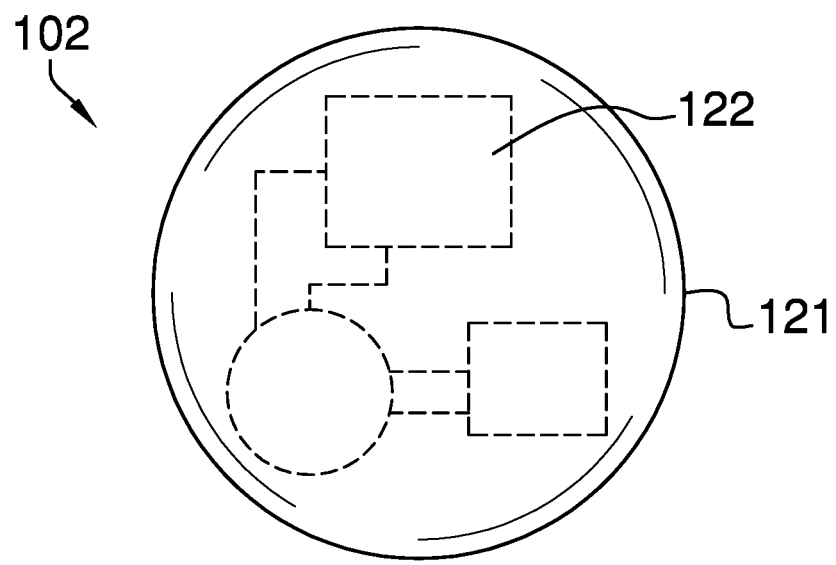
FIG. 2 is a front view of an embodiment of the disclosure.
Figure 3:
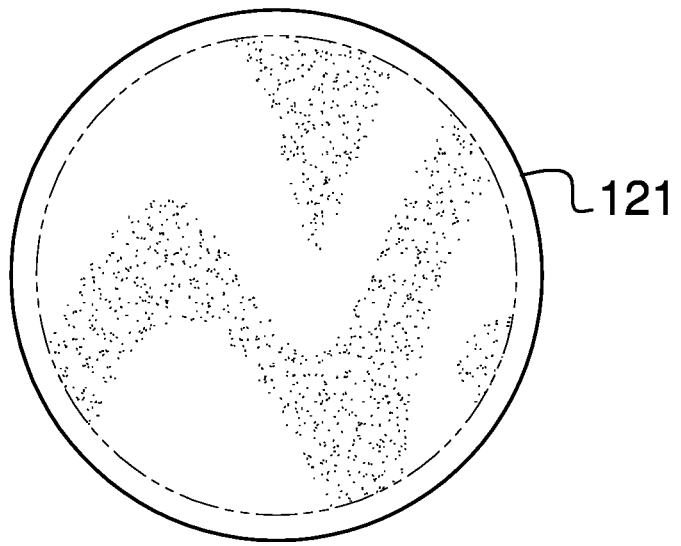
FIG. 3 is a rear view of an embodiment of the disclosure.
Figure 4:
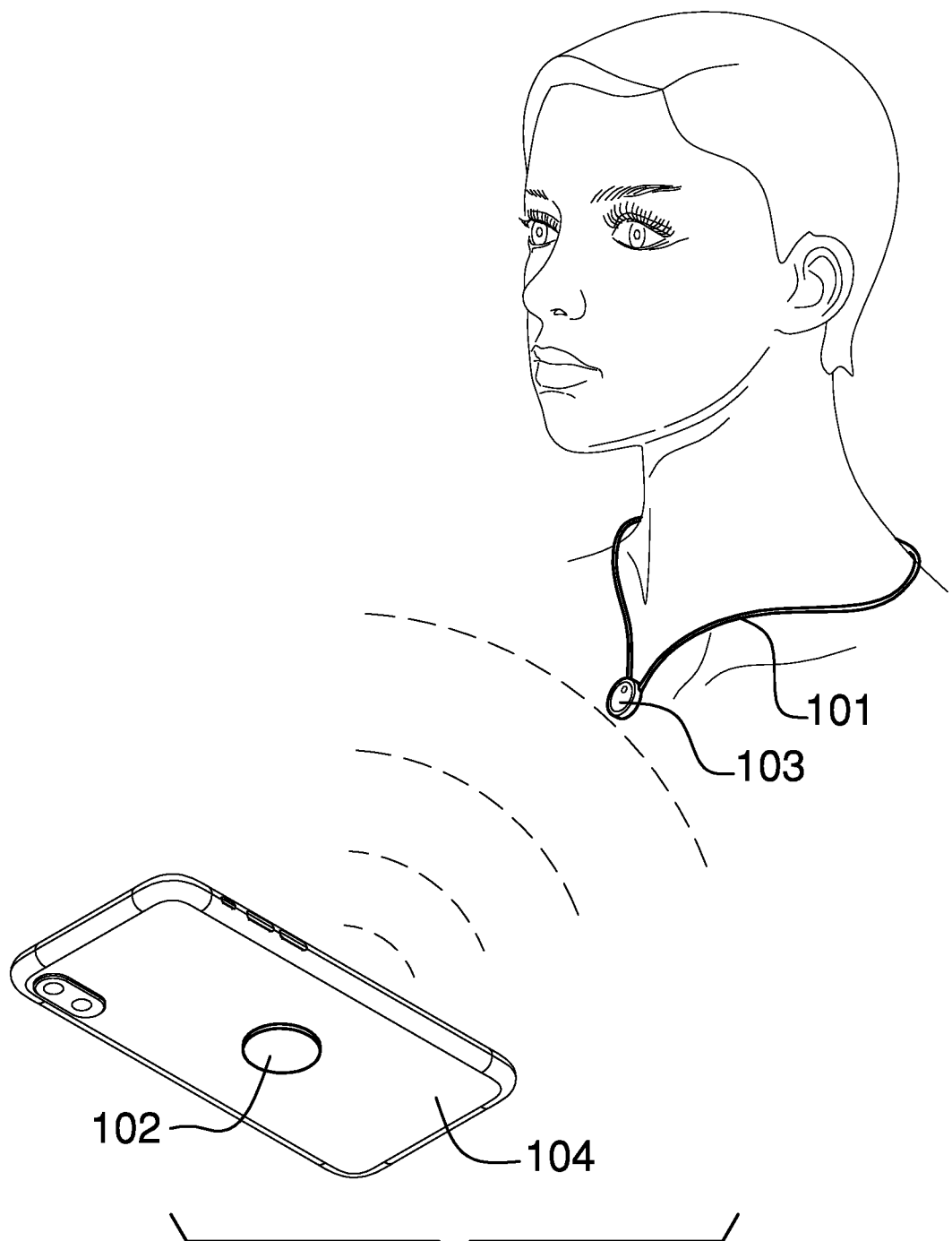
FIG. 4 is an in-use view of an embodiment of the disclosure.
Figure 5:
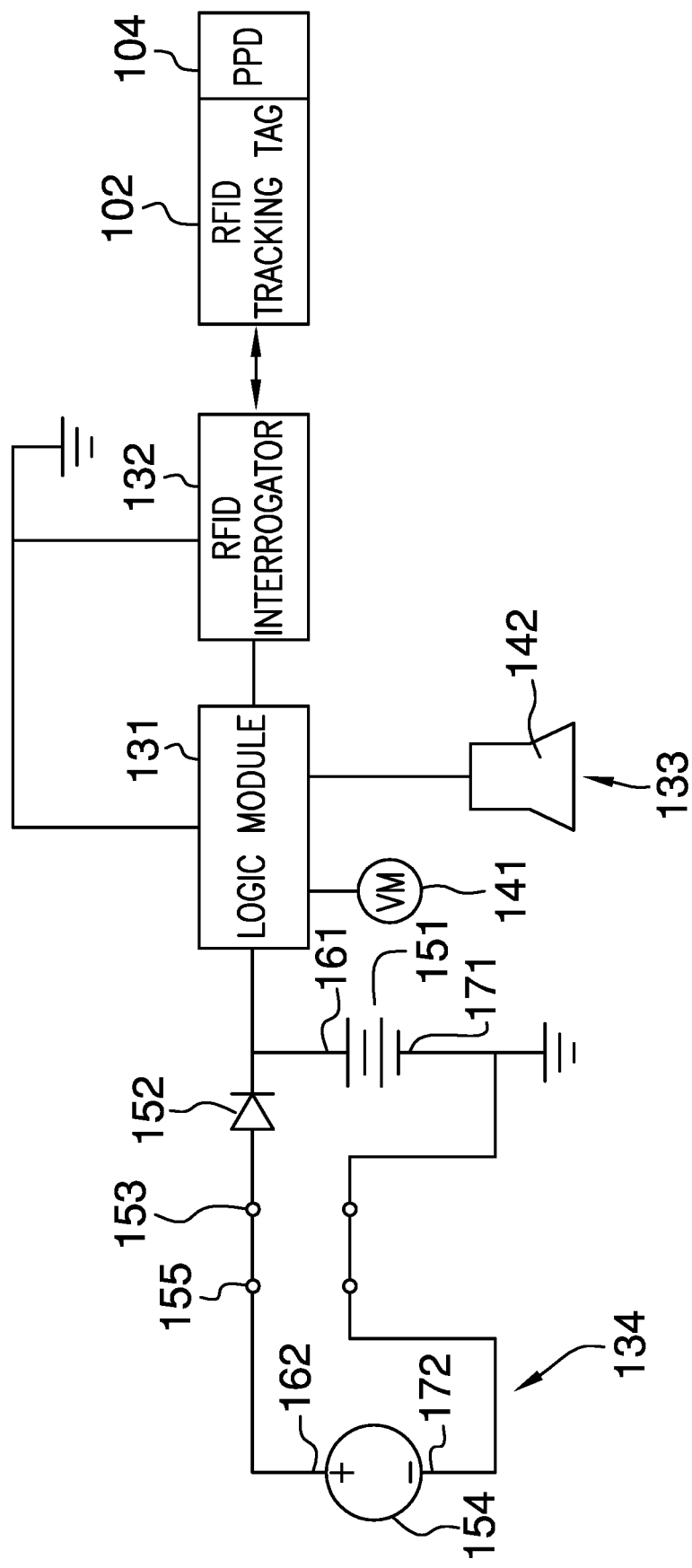
FIG. 5 is a schematic view of an embodiment of the disclosure.

Detailed reference will now be made to one or more potential embodiments of the disclosure, which are illustrated in FIGS. 1 through 5.

The cell phone proximity alarm system 100 (hereinafter invention) is a proximity alarm system. The invention 100 is configured for use with one or more personal data devices 104. The invention 100 tracks each of the one or more personal data devices 104 by detecting the presence of each of the one or more personal data devices 104. When the invention 100 fails to detect any personal data device selected from the one or more personal data devices 104, the invention 100 generates an audible alarm and a tactile alarm. The invention 100 comprises a jewelry item 101, one or more PDD tags 102, and a control circuit 103. Each of the one or more PDD tags 102 attaches to a personal data device selected from the one or more personal data devices 104. The jewelry item 101 contains the control circuit 103. The control circuit 103 generates a radio frequency transmission that detects the presence of each of the one or more PDD tags 102. If the control circuit 103 does not detect a PDD tag selected from the one or more PDD tags 102, the control circuit 103 generates the audible alarm and the tactile alarm.

Each of the personal data devices 104 is a programmable electrical device that provides data management and communication services through one or more functions referred to as an application.

The jewelry item 101 is a decorative personal item that is worn by the individual using the invention 100. The jewelry item 101 contains the control circuit 103. The jewelry item 101 further comprises a circuit housing 111. The circuit housing 111 is a rigid casing. The circuit housing 111 contains the control circuit 103. The circuit housing 111 is formed with all apertures and form factors necessary to allow the circuit housing 111 to accommodate the use and operation of the control circuit 103. Methods to form a circuit housing 111 suitable for the purposes described in this disclosure are well-known and documented in the mechanical arts.

Each of the one or more PDD tags 102 is a physical structure that contains an RFID tracking tag 122. The RFID tracking tag 122 is defined elsewhere in this disclosure. Each of the one or more PDD tags 102 is a disk-shaped structure that physically attaches to a personal data device selected from the one or more personal data devices 104. Each of the one or more PDD tags 102 responds to an interrogation signal generated by the control circuit 103 with a unique code that identifies each personal data device selected from the one or more personal data devices 104 associated with the selected PDD tag. Each of the one or more PDD tags 102 comprises a tag housing 121 and an RFID tracking tag 122.

The tag housing 121 is a rigid casing. The tag housing 121 contains the RFID tracking tag 122. The tag housing 121 is formed with all apertures and form factors necessary to allow the tag housing 121 to accommodate the use and operation of the selected PDD tag. Methods to form a tag housing 121 suitable for the purposes described in this disclosure are well-known and documented in the mechanical arts.

The RFID tracking tag 122 is an electric device. The RFID tracking tag 122 is defined elsewhere in this disclosure. The RFID tracking tag 122 reflects the interrogation signal generated by the one or more PDD tags 102 back to the control circuit 103. The RFID tracking tag 122 encodes in the reflected signal a unique identification code that allows the control circuit 103 to uniquely identify the RFID tracking tag 122.

The control circuit 103 is an electric circuit. The control circuit 103 installs in the circuit housing 111 of the jewelry item 101. The control circuit 103 transmits a radio frequency interrogation signal on a regular basis. The control circuit 103 is an independently powered electric circuit. By independently powered is meant that the control circuit 103 can operate without an electrical connection to an external power source 154. The control circuit 103 assumes that each personal data device selected from the one or more personal data devices 104 associated with each selected PDD tag that responds to the interrogation signal is within 12 meters of the jewelry item 101.

The control circuit 103 locates the one or more personal data devices 104 by locating the one or more PDD tags 102. The control circuit 103 detects the reflection of the transmitted radio frequency interrogation signal by each of the one or more PDD tags 102. If the control circuit 103 fails to detect the reflection of the transmitted interrogation signal from a PDD tag selected from the one or more PDD tags 102, the control circuit 103 generates an audible alarm and a tactile alarm indicating that a personal data device selected from the one or more personal data devices 104 associated with the selected PDD tag that was not detected is missing.

The control circuit 103 comprises a logic module 131, an RFID interrogator 132, a plurality of alert mechanisms 133, and a power circuit 134. The logic module 131, the RFID interrogator 132, the plurality of alert mechanisms 133, and the power circuit 134 are electrically interconnected.

The logic module 131 is an electric circuit. The logic module 131 is a programmable circuit. The logic module 131 controls the operation of the RFID interrogator 132. The logic module 131 controls the operation of the plurality of alert mechanisms 133. The logic module 131 signals the RFID interrogator 132 to generate the interrogation signal. The logic module 131 monitors the RFID interrogator 132 to detect the receipt of a reflection from each of the one or more PDD tags 102. If the logic module 131 fails to detect the reflection signal from any PDD tag selected from the one or more PDD tags 102, the logic module 131 actuates the audible alarm and the tactile alarm by actuating the plurality of alert mechanisms 133.

The RFID interrogator 132 is an electric device. The RFID interrogator 132 physically transmits the interrogation signal to the one or more PDD tags 102. The RFID interrogator 132 physically detects the reflection of the interrogation signal by each of the one or more PDD tags 102 that are within range of the RFID interrogator 132. The RFID interrogator 132 transmits the codes contained within the received reflections from the interrogation signal to the logic module 131. The RFID interrogator 132 and the one or more PDD tags 102 are low energy systems with an effective range of approximately 12 meters.

Each of the plurality of alert mechanisms 133 is a transducer. Each of the plurality of alert mechanisms 133 electrically connects to the logic module 131. The logic module 131 controls the operation of each of the plurality of alert mechanisms 133. The plurality of alert mechanisms 133 generates the audible alarm. The plurality of alert mechanisms 133 generates the tactile alarm. The plurality of alert mechanisms 133 comprises a vibration motor 141 and a speaker 142.

The vibration motor 141 is an electric motor. The vibration motor 141 is defined elsewhere in this disclosure. The logic module 131 generates the tactile alarm by actuating the vibration motor 141. The speaker 142 is a transducer. The speaker 142 converts an electrical signal received from the logic module 131 into an audible sound. The speaker 142 is defined elsewhere in this disclosure. The logic module 131 controls the operation of the speaker 142. The logic module 131 generates the audible alarm by actuating the speaker 142. In a second potential embodiment of the disclosure, the vibration motor 141 and the speaker 142 are replaced by a buzzer.

The power circuit 134 is an electrical circuit. The power circuit 134 powers the operation of the control circuit 103. The power circuit 134 is an electrochemical device. The power circuit 134 converts chemical potential energy into the electrical energy required to power the control circuit 103. The power circuit 134 comprises a battery 151, a diode 152, a charging port 153, and an external power source 154. The battery 151 comprises a first positive terminal 161 and a first negative terminal 171. The external power source 154 further comprises a charging plug 155, a second positive terminal 162, and a second negative terminal 172. The battery 151, the diode 152, the charging port 153, the external power source 154, and the charging plug 155 are electrically interconnected.

The battery 151 is an electrochemical device. The battery 151 converts chemical potential energy into the electrical energy used to power the control circuit 103. The battery 151 is a commercially available rechargeable battery 151. The chemical energy stored within the rechargeable battery 151 is renewed and restored through the use of the charging port 153. The charging port 153 is an electrical circuit that reverses the polarity of the rechargeable battery 151 and provides the energy necessary to reverse the chemical processes that the rechargeable battery 151 initially used to generate the electrical energy. This reversal of the chemical process creates a chemical potential energy that will later be used by the rechargeable battery 151 to generate electricity.

The charging port 153 forms an electrical connection to an external power source 154 using a charging plug 155. The charging plug 155 forms a detachable electrical connection with the charging port 153. The charging port 153 receives electrical energy from the external power source 154 through the charging plug 155. The diode 152 is an electrical device that allows current to flow in only one direction. The diode 152 installs between the rechargeable battery 151 and the charging port 153 such that electricity will not flow from the first positive terminal 161 of the rechargeable battery 151 into the second positive terminal 162 of the external power source 154. In the first potential embodiment of the disclosure, the external power source 154, the charging plug 155, and the charging port 153 are compatible with USB power requirements.

The following definitions were used in this disclosure:

Battery: As used in this disclosure, a battery is a chemical device consisting of one or more cells, in which chemical energy is converted into electricity and used as a source of power. Batteries are commonly defined with a positive terminal and a negative terminal.

Buzzer: As used in this disclosure, a buzzer is two lead electrical device that generates an audible sound and a tactile vibration when voltage is applied to the two leads.

Control Circuit: As used in this disclosure, a control circuit is an electrical circuit that manages and regulates the behavior or operation of a device.

Logical Device: As used in this disclosure, a logical device is an electrical device that processes externally provided inputs to generate outputs that are determined from a previously determined logical functions. A logical device may or may not be programmable.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Housing: As used in this disclosure, a housing is a rigid structure that encloses and protects one or more devices.

Jewelry: As used in this disclosure, jewelry is a personal decorative item that is worn by a person. Examples of jewelry include, but are not limited to, necklaces, bracelets, rings, earrings, cufflinks, brooches, and wristwatches.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Motor: As used in this disclosure, a motor refers to the method of transferring energy from an external power source into rotational mechanical energy.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

RFID: As used in this disclosure, RFID refers to Radio Frequency Identification technology. RFID is a wireless technology that uses an electromagnetic field to identify and retrieve data from tracking tags that are placed on or near an object.

RFID Interrogator: As used in this disclosure, an RFID interrogator is a device that transmits a radio signal at frequency designed to activate RFID tracking tags that are tuned to operate at that frequency.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. The RFID tracking tag as described to this point is a passive, or unpowered RFID tracking tag. There are also available within RFID technology active, or powered, RFID tracking tags. An active RFID tracking tag acts as a beacon that actively transmits identification information in a manner that can be received and recorded by an RFID interrogator. Within this disclosure, both passive and active RFID tracking tags are used.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vibration Motor: As used in this disclosure, a vibration motor is an electric motor that rotates an unbalanced weight in such a manner that the electric motor vibrates during operation. The vibration can be varied by varying the rotational speed of the vibration motor. The rotational speed is varied by varying the electric current flowing through the vibration motor.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A proximity alarm system comprising
a jewelry item, one or more PDD tags, and a control circuit;
wherein the jewelry item contains the control circuit;
wherein the proximity alarm system is configured for use with one or more personal data devices;
wherein each of the one or more PDD tags attaches to a personal data device selected from the one or more personal data devices;
wherein the proximity alarm system tracks each of the one or more personal data devices by detecting the presence of each of the one or more personal data devices;
wherein when the proximity alarm system fails to detect any personal data device selected from the one or more personal data devices, the proximity alarm system generates an audible alarm and a tactile alarm;
wherein the control circuit comprises a logic module, an RFID interrogator, a plurality of alert mechanisms, and a power circuit;
wherein the logic module, the RFID interrogator, the plurality of alert mechanisms, and the power circuit are electrically interconnected;
wherein the power circuit comprises a battery, a diode, a charging port, and an external power source;
wherein the battery comprises a first positive terminal and a first negative terminal;
wherein the external power source further comprises a charging plug, a second positive terminal, and a second negative terminal;
wherein the battery, the diode, the charging port, the external power source, and the charging plug are electrically interconnected;
wherein the battery is a rechargeable battery;
wherein the charging port is an electrical circuit that reverses the polarity of the rechargeable battery and provides the energy necessary to reverse the chemical processes that the rechargeable battery initially used to generate the electrical energy;
wherein the charging port forms an electrical connection to an external power source using a charging plug;
wherein the charging plug forms a detachable electrical connection with the charging port;
wherein the charging port receives electrical energy from the external power source through the charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

2. The proximity alarm system according to claim 1
wherein each of the personal data devices is a programmable electrical device;
wherein the jewelry item is a decorative personal item that is worn by the individual using the proximity alarm system;
wherein the control circuit transmits an interrogation signal that detects the presence of each of the one or more PDD tags;
wherein the interrogation signal is a signal radio frequency transmission;
wherein if the control circuit does not detect a PDD tag selected from the one or more PDD tags, the control circuit generates the audible alarm and the tactile alarm.

3. The proximity alarm system according to claim 2
wherein the jewelry item further comprises a circuit housing;
wherein the circuit housing is a rigid casing;
wherein the circuit housing contains the control circuit.

4. The proximity alarm system according to claim 3
wherein each of the one or more PDD tags is a physical structure that contains an RFID tracking tag;
wherein each of the one or more PDD tags is a disk-shaped structure that physically attaches to a personal data device selected from the one or more personal data devices.

5. The proximity alarm system according to claim 4 wherein each of the one or more PDD tags responds to an interrogation signal generated by the control circuit with a unique code that identifies each personal data device selected from the one or more personal data devices associated with the selected PDD tag.

6. The proximity alarm system according to claim 5
wherein the control circuit is an electric circuit;
wherein the control circuit installs in the circuit housing of the jewelry item;
wherein the control circuit transmits the interrogation signal on a regular basis.

7. The proximity alarm system according to claim 6
wherein the control circuit is an independently powered electric circuit;
wherein by independently powered is meant that the control circuit can operate without an electrical connection to an external power source.

8. The proximity alarm system according to claim 7
wherein the control circuit locates the one or more personal data devices by locating the one or more PDD tags;
wherein the control circuit detects the reflection of the transmitted interrogation signal by each of the one or more PDD tags;
wherein if the control circuit fails to detect the reflection of the transmitted interrogation signal from a PDD tag selected from the one or more PDD tags, the control circuit generates an audible alarm and a tactile alarm indicating that a personal data device selected from the one or more personal data devices associated with the selected PDD tag that was not detected is missing.

9. The proximity alarm system according to claim 8
wherein each of the one or more PDD tags comprises a tag housing and an RFID tracking tag;
wherein the tag housing contains RFID tracking tag.

10. The proximity alarm system according to claim 9
wherein the tag housing is a rigid casing.

11. The proximity alarm system according to claim 10
wherein the RFID tracking tag is an electric device;
wherein the RFID tracking tag reflects the interrogation signal generated by the one or more PDD tags back to the control circuit;
wherein the RFID tracking tag encodes in the reflected signal a unique identification code that allows the control circuit to uniquely identify the RFID tracking tag.

12. The proximity alarm system according to claim 11
wherein the logic module is an electric circuit;
wherein the logic module is a programmable circuit;
wherein the logic module controls the operation of the RFID interrogator;
wherein the logic module controls the operation of the plurality of alert mechanisms;
wherein the logic module signals the RFID interrogator to generate the interrogation signal;
wherein the logic module monitors the RFID interrogator to detect the receipt of a reflection from each of the one or more PDD tags;
wherein if the logic module fails to detect the reflection signal from any PDD tag selected from the one or more PDD tags, the logic module actuates the audible alarm and the tactile alarm by actuating the plurality of alert mechanisms.

13. The proximity alarm system according to claim 12
wherein the RFID interrogator is an electric device;
wherein the RFID interrogator physically transmits the interrogation signal to the one or more PDD tags;
wherein the RFID interrogator physically detects the reflection of the interrogation signal by each of the one or more PDD tags that are within range of the RFID interrogator.

14. The proximity alarm system according to claim 13 wherein the RFID interrogator transmits the unique identification code contained within the received reflections from the interrogation signal to the logic module.

15. The proximity alarm system according to claim 14
wherein each of the plurality of alert mechanisms is a transducer;
wherein each of the plurality of alert mechanisms electrically connects to the logic module;
wherein the logic module controls the operation of each of the plurality of alert mechanisms;
wherein the plurality of alert mechanisms generates the audible alarm;
wherein the plurality of alert mechanisms generates the tactile alarm.

16. The proximity alarm system according to claim 15
wherein the plurality of alert mechanisms comprises a vibration motor and a speaker;
wherein the vibration motor is an electric motor;
wherein the logic module generates the tactile alarm by actuating the vibration motor;
wherein the speaker is a transducer;
wherein the speaker converts an electrical signal received from the logic module into an audible sound;
wherein the logic module controls the operation of the speaker;
wherein the logic module generates the audible alarm by actuating the speaker.

17. The proximity alarm system according to claim 16
wherein the power circuit is an electrical circuit;
wherein the power circuit powers the operation of the control circuit;
wherein the power circuit is an electrochemical device;
wherein the power circuit converts chemical potential energy into the electrical energy required to power the control circuit.

* * * * *